United States Patent [19]
Nakano

[11] Patent Number: 6,114,784
[45] Date of Patent: Sep. 5, 2000

[54] MOTOR WITH COOLING STRUCTURE

[75] Inventor: Masaki Nakano, Yokohama, Japan

[73] Assignee: Nissan Motor Co., Ltd., Yokohama, Japan

[21] Appl. No.: 09/337,511

[22] Filed: Jun. 22, 1999

[30] Foreign Application Priority Data

Jun. 22, 1998 [JP] Japan .................. 10-174543

[51] Int. Cl.[7] .................. H02K 9/00; H02K 9/08; H02K 1/22; H02K 47/04; H02K 16/00
[52] U.S. Cl. .................. 310/59; 310/57; 310/54; 310/113; 310/114; 310/216; 310/259; 310/266
[58] Field of Search .................. 310/59, 58, 57, 310/54, 52, 112, 113, 114, 216, 254, 258, 259, 266; 105/59; 363/104

[56] References Cited

U.S. PATENT DOCUMENTS

| | | | |
|---|---|---|---|
| 3,462,626 | 8/1969 | Kluss | 310/114 |
| 4,745,314 | 5/1988 | Nakano | 310/57 |
| 4,839,545 | 6/1989 | Chitayat | 310/12 |
| 5,705,865 | 1/1998 | Ishida et al. | 310/62 |
| 5,744,895 | 4/1998 | Seguchi et al. | 310/266 |
| 5,793,136 | 8/1998 | Redzic | 310/114 |
| 5,886,433 | 3/1999 | Oda et al. | 310/59 |
| 5,973,427 | 10/1999 | Suzuki et al. | 310/54 |

FOREIGN PATENT DOCUMENTS 9-46984  2/1997  Japan .

*Primary Examiner*—Clayton LaBalle
*Assistant Examiner*—Dang Dinh Le
*Attorney, Agent, or Firm*—Foley & Lardner

[57] ABSTRACT

In a motor having a cylindrical stator fixed to a motor housing and inner and outer rotors concentrically arranged to the stator, a cooling structure of the motor includes cooling jackets formed in the stator. Coolant inlet and outlet ports are provided at an axial end of the rotor which end is opposite to an output end portion of the outer rotor. The coolant inlet and outlet ports are connected to the cooling jackets to supply and discharge coolant to and from the cooling jackets. A coolant return portion is provided at the other axial end of the rotor and connects each pair of the cooling jackets.

19 Claims, 8 Drawing Sheets

MOTOR WITH COOLING STRUCTURE

BACKGROUND OF THE INVENTION

The present invention relates to a multi-layer motor in which an inner rotor, a stator and an outer rotor are concentrically arranged, and more particularly to a multi-layer motor with a cooling structure.

A variety of motors with cooling structures have been proposed and in practical use. A typical motor with an air-cooling structure is disclosed in Japanese Patent Provisional Publication No. H9-46984.

SUMMARY OF THE INVENTION

However, it is desired to further effectively cool motors in order to adapt to a multi-layer motor which generates a large amount of heat. Although one of effective cooling methods is to cool the multi-layer motor by circulating coolant such as water through a stator, the multi-layer motor has structural difficulty in employing a liquid cooling structure. Therefore, it is necessary to propose a new liquid cooling structure which effectively functions if applied to a multi-layer motor having a stator, inner and outer rotors which are concentrically arranged on a motor axis.

It is an object of the present invention to provide a multi-layer motor with a cooling structure which overcomes the above-mentioned difficulty.

A motor with a cooling structure according to the present invention comprises a motor housing, a cylindrical stator fixed to the motor housing, outer and inner rotors, a plurality of pairs of cooling jackets, coolant inlet and outlet ports and a coolant return portion. The outer rotor is rotatablly installed around the stator. The inner rotor is rotatably installed inside the stator. The inner rotor, the stator and the said outer rotor are concentrically arranged. The cooling jackets are formed in the stator. The coolant inlet and outlet ports are provided at an axial end of said rotor which end is opposite to a power output portion of said outer rotor. The coolant inlet and outlet ports are connected to the cooling jackets to supply and discharge coolant to and from the cooling jackets. The coolant return portion is provided at the other axial end of said rotor and is connecting each pair of said cooling jackets.

DETAILED DESCRIPTION OF THE INVENTION

Referring to FIG. 1 to 9, there is shown an embodiment of a motor with a cooling structure according to the present invention.

Figure 1:
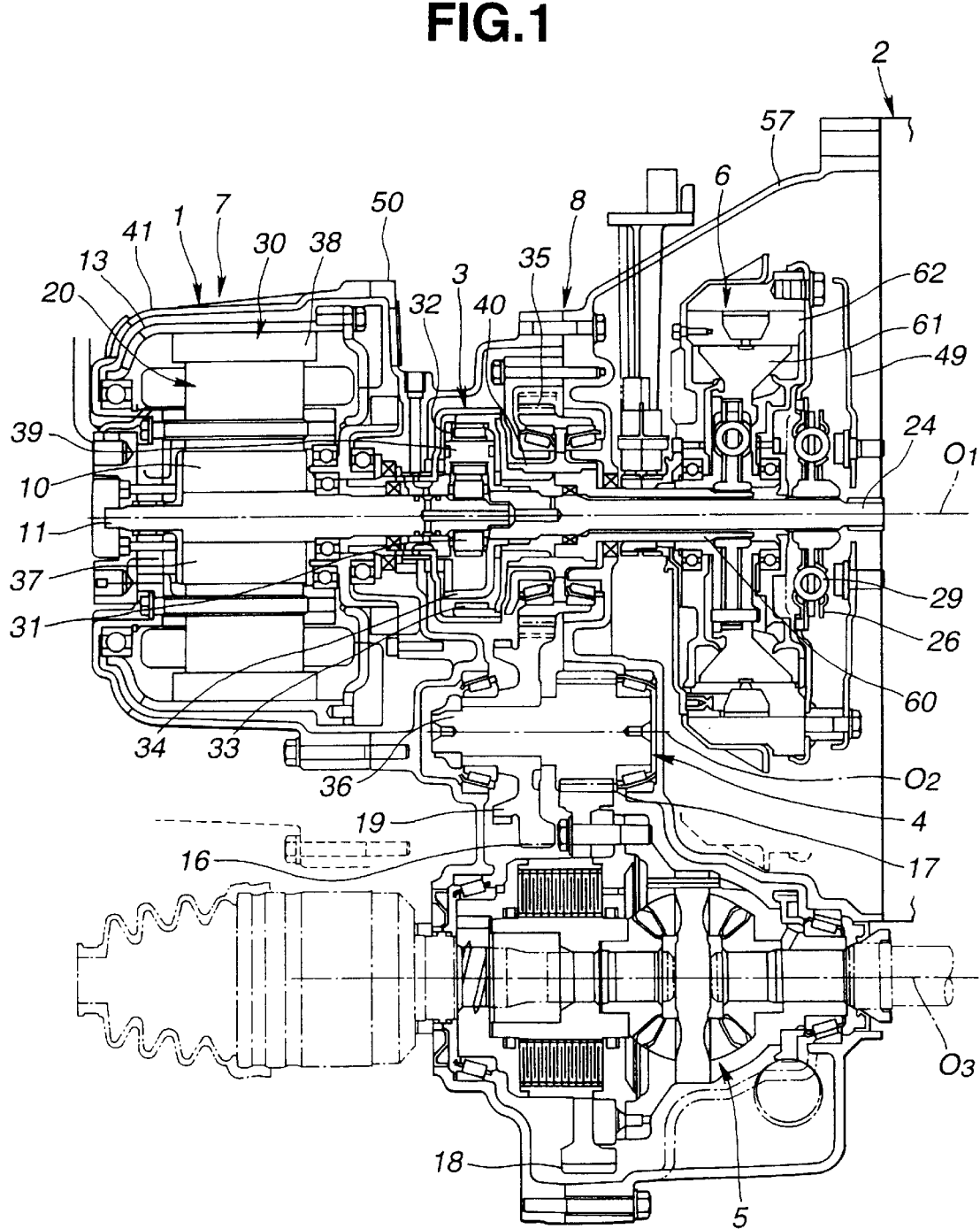
FIG. 1 is a cross-sectional view of a hybrid drive system employing a motor with a cooling structure according to the present invention.

FIG. 1 shows a hybrid drive system for a vehicle which system comprises a multi-layer motor 1 with a cooling structure, an engine 2, a planetary gear mechanism 3, a reduction gear mechanism 4 and a differential gear mechanism 5. The multi-layer motor 1, the engine 2 and the planetary gear mechanism 3 are disposed on a first axial line $O_1$ of FIG. 1. The reduction gear mechanism 4 is disposed on a second axial line $O_2$ parallel with the first axial line $O_1$. The differential gear mechanism 5 is disposed on a third axial line $O_3$ of FIG. 1 parallel with the first axial line $O_1$. An output torque outputted from the engine 2 and/or the multi-layer motor 1 is transmitted through an output gear 35 and the reduction gear mechanism 4 to a final gear 18 of the differential gear mechanism 5. The torque transmitted to the final gear 18 is transmitted to right and left wheels through the differential gear mechanism 5.

An idler shaft 36 of the reduction gear mechanism 4 is connected to a primary reduction gear 16 meshed with the output gear 35, a secondary reduction gear 17 meshed with the final gear 18 of the differential gear mechanism 5, and a parking gear 19 fixed during a vehicle parking period.

The multi-layer motor 1 has a multi-rotor structure in which an inner rotor 10 and an outer rotor 30 and a cylindrical stator 20 are concentrically arranged so that the inner rotor 10 is disposed inside the cylindrical stator 20 with a first predetermined clearance therebetween and the outer rotor 30 is disposed outside of the cylindrical stator 20 with a second predetermined clearance therebetween. The inner rotor 10 is constituted by a cylindrical inner rotor shaft 11 rotatably supported to a motor housing 41 through bearings and a plurality of permanent magnets 38 fixed around the inner rotor shaft 11. The outer rotor 30 is constituted by a cylindrical outer rotor dram 13 rotatably supported to the motor housing 41 through bearings and a plurality of permanent magnets 38 fixed on an inner surface of the outer rotor dram 11. The stator 20 is constituted by a plurality of core steel plates 21 laminated in an axial direction and a plurality of coils 15 wound around the core steel plate 21. The coils 15 of the stator 20 are adapted to both of the inner and outer rotors 10 and 30. By flowing complex current to each coil 15 so as to generate rotating magnetic field at the inner and outer rotors 10 and 30, the multi-layer motor 1 functions as a motor. In reverse, by rotating the inner and outer rotors 10 and 30, the multi-layer motor 1 functions as a generator. This arrangement of the multi-layer motor 1 enables the size thereof to be smaller and suppresses the loss of the current thereof. The basic structure of the multi-layer motor 1 is proposed in a Japanese Patent application (Tokugan-Heisei) 10-77449 filed in Japan by the applicant of the present patent application, the disclosure of which is hereby incorporated by reference.

The planetary gear mechanism 3 comprises a sun gear 31, a plurality of pinions 32 meshed with the sun gear 31, a carrier 34 rotatably supporting the pinions 32 through pinion shafts 39, and a ring gear 33 meshed with the pinions 32. The sun gear 31, the carrier 34 and the ring gear 33 are concentrically arranged to form a multiple shaft structure of a three-layer. The sun gear 31 is connected to the inner rotor 10. The carrier 34 is connected to a crankshaft of the engine 2 through an engine output shaft 24 and a flywheel damper 26. The ring gear 33 is connected to the outer rotor 30 and an output gear 35. A drive plate 49 is fixed to a rear end of the crankshaft by bolts 29.

Since the outer rotor 30 is connected to the output gear 35 through the ring gear 33, a large torque is directly applied from the outer rotor 30 to an output gear shaft 40 fixed to the output gear 35 when the vehicle starts running. Further, regenerative power generation is effectively carried out by directly applying torque from the output gear 35 to the outer rotor 30 when the vehicle is decelerated.

When an electromagnetic clutch 6 is put in a disengaged state, the torque of the engine 2 is transmitted through the crankshaft, a drive plate 49, the flywheel damper 26 and the engine output shaft 24 to the carrier 34 and is distributed through the pinions 32 to the sun gear 31 and the ring gear 33. During this period, a rotation speed and a torque of the output gear 35 is controlled by properly operating the inner and outer rotors 10 and 30 as a motor or generator. The engine 2 is started by rotating the crankshaft by the operation of the multi-layer motor 1, more particularly, operating the inner rotor 10 as a motor.

When the electromagnetic clutch 6 is put in an engaged state, the torque of the engine 2 is transmitted through the crankshaft, the drive plate 49, a driver member 62, a driven member 61 and a clutch output shaft 60 to the output gear 35. Therefore, when the vehicle is running at high speed, the torque of the engine 2 is directly transmitted to the output gear 35. During this period, the electromagnetic clutch 6, the drive plate 49 and the flywheel damper 26 function as a mass of a flywheel.

The hybrid drive system is constituted by a first sub-assembly unit 7 and a second sub-assembly 8. The first sub-assembly unit 7 includes the multi-layer motor 1 received in the motor housing 41. The second sub-assembly unit 8 includes the planetary gear mechanism 3, the reduction gear mechanism 4 and the differential gear mechanism 5 which are received in a gear housing 50 and a clutch housing 57.

Figure 2:
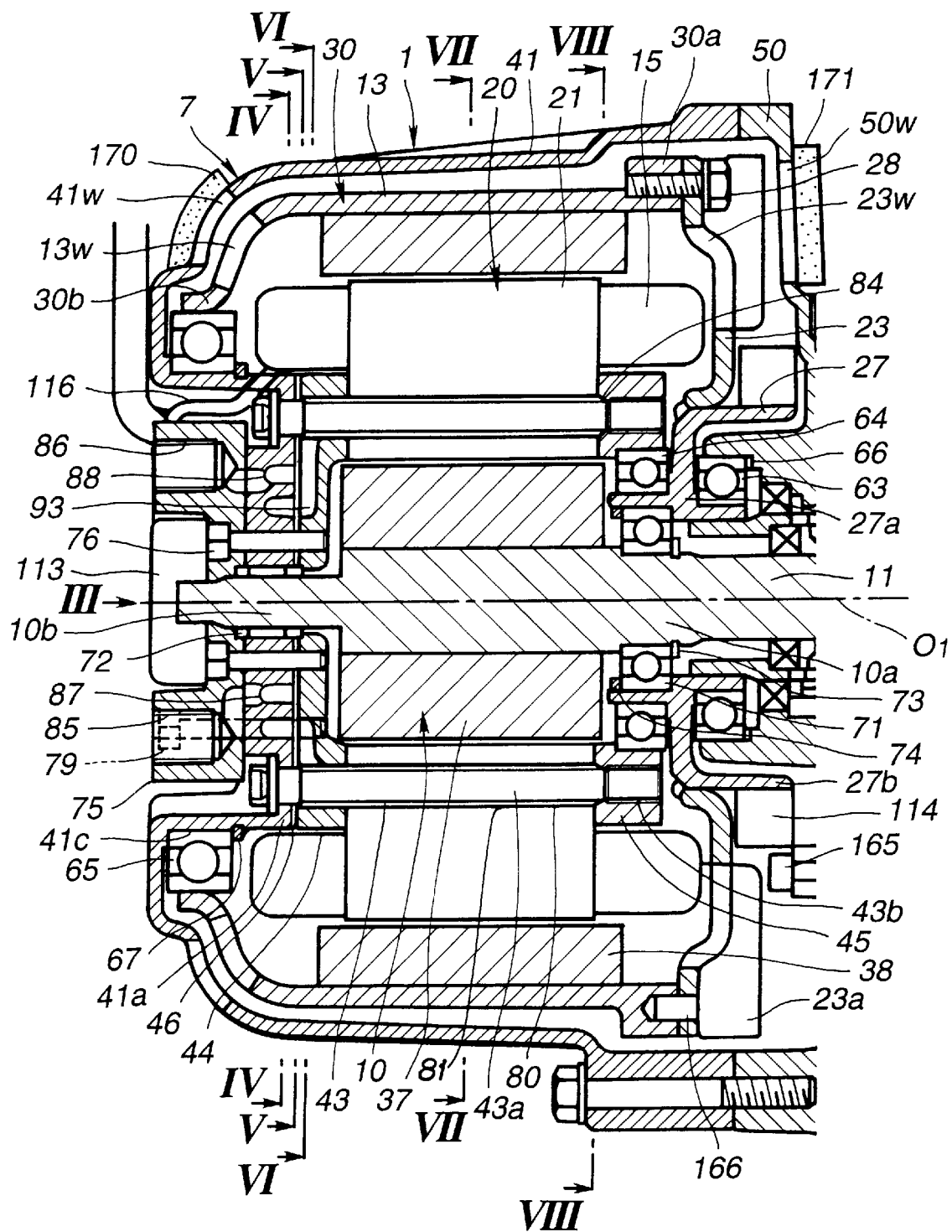
FIG. 2 is a cross-sectional view showing the motor with the cooling structure according to the present invention.

As shown in FIG. 2, the motor housing 41 of the multi-layer motor 1 has a cylindrical shape having a bottom portion 41*a*. The stator 20 of a cylindrical shape is coaxially fixed to the bottom portion 41*a* of the motor housing 41 by means of a plurality of bolts 43. A disc-shaped partition plate 46 and a stator bracket 44 are installed between the bottom portion 41*a* and a rear surface of the stator 20. A disc-shaped front plate 45 is installed to a front end surface of the stator 20. The bolts 43 penetrate the bottom portion 41*a* of the motor housing 41, the partition plate 46, the stator bracket 44 and the stator 20 and are tightened to the front plate 45 so as to fix the stator 20 to the motor housing 41.

A pair of outer rotor shaft portions 30*a* and 30*b* are installed at both ends of the outer rotor 30, respectively, and are rotatably supported to ball bearings 63 and 64 and a ball bearing 65, respectively. The outer rotor shaft portion 30*a* functions as an outer rotor output portion for outputting an output power of the outer rotor 30. The outer rotor shaft portion 30*a* is divided into a cylindrical outer rotor dram 13 connected with the permanent magnets 38 and a thrust receiving member of the outer rotor dram 13. An outer dram cover 23 is fixed to a front end portion of the outer rotor dram 13 by means of a plurality of bolts 28, and an inner dram cover 27 is welded to the an inner peripheral end of the outer dram cover 23 so that the outer rotor dram 13 functions as a thrust receiving member. The outer dram cover 23 is positioned at a predetermined position with respect to the outer rotor dram 13 through a knock pin 166.

Openings 50*w*, 23*w*, 13*w* and 41*w* are provided to supply cooling air into the gear housing 50, the outer dram cover 23, the outer rotor dram 13 and the motor housing 41, respectively. The outer dram cover 23 has a plurality of cooling fins 23*a* which are formed by press-forming. The cooling fins 23*a* supply cooling air to the stator 20 when the outer rotor 20 is rotating. Air filters 170 and 171 are installed at the openings 41*w* and 50*w*, respectively so that cooling air is supplied to an inner space of the motor housing 41 through the air filters 170 and 171. The arrangement of the air filters 170 and 171 prevents dust including iron powder from entering into the motor housing 41, so as not to attach iron powder to the permanent magnets 37 and 38.

The inner dram cover 27 is made by casting or forging and has a cylindrical shaft portion 27*a* and a scale portion 27*b*. The outer dram cover 23 and the inter dram cover 27 are fixedly connected with each other by means of electron beam welding for suppressing thermal deformation therebetween.

The ball bearings 63 and 64 of a deep groove type are installed between the gear housing 50 and the stator 20 so as to sandwich the outer rotor shaft portion 30*a* therebetween. A rear end of an inner race of the deep groove ball bearing 63 is in contact with a cylindrical shaft portion 27*a* of the outer rotor shaft portion 30*a*, and a front end of an outer race of the deep groove ball bearing 63 is in contact with the gear housing 50 through a shim 66. A rear end of an inner race of the deep groove ball bearing 64 is in contact with the cylindrical shaft portion 27*a*, and a frond end of an outer race of the deep groove ball bearing 64 is in contact with the front plate 45 of the stator 20. The ball bearing 63 receives a thrust load of the outer rotor dram 13 toward a forward direction corresponding to a rightward direction in FIG. 2. The ball bearing 64 receives a thrust load of the outer rotor dram 14 toward a rearward direction corresponding to a leftward direction in FIG. 2.

The outer rotor shaft portion 30*b* is integrally formed with a rear end portion of the outer rotor dram 13. The ball bearing 65 of a deep groove type is installed between the outer rotor shaft portion 30*b* and the motor housing 41. An inner race of the deep groove ball bearing 65 is fixed to a cylinder portion 41*c* of the motor housing 41 through a snap ring 67. An outer race of the deep groove ball bearing 65 is slidably engaged with the outer rotor shaft portion 30*b*. A radial load of the outer rotor dram 13 is received by the ball bearings 63, 64 and 65.

Since an opening diameter of the outer rotor shaft portion 30*b* is smaller than an outer diameter of the stator 20, it is necessary to assemble the outer rotor dram 13 to the motor housing 41 prior to an assembling of the stator 20 during the assembling process of the first sub-assembly unit 7. Therefore, the outer rotor dram 13 and the outer dram cover 23 are arranged to be separable with each other and to facilitate a positioning of the outer rotor shaft portion 30*b* in the thrust direction. The assembling process of the first sub-assembly unit 7 is executes as follows: (1) The ball bearing 65 is to the motor housing 41 through the snap ring 67. (2) The outer rotor shaft portion 30*b* is engaged to the outer race of the ball bearing 65. (3) The stator 20 is fixed to the motor housing 41 by means of the bolts 43. (4) The outer dram cover 23 is fixed at the front end portion of the outer rotor dram 13 by means of the bolts 28.

An inner rotor shaft portion 10*a* for outputting the power of the inner rotor 10 is integrally formed with the inner rotor shaft 11. An inner race of a deep groove ball bearing 71 is engaged with the inner rotor shaft portion 10*a* and is fixed by means of a snap ring 73. An outer race of the deep groove ball bearing 71 is engaged with a cylindrical shaft portion 27*a* of the outer rotor shaft portion 30*a* and is fixed by means of a snap ring 74.

An inner rotor shaft portion 10*b* located at a side opposite to the inner rotation shaft portion 10*a* is integrally formed with a rear end portion of the inner rotor shaft 11. A radial needle roller bearing (second bearing) 72 is disposed between the bottom portion 41a of the motor housing 41 and the inner rotor shaft portion 10b. The radial needle roller bearing 72 has a grease sealed structure. The radial needle roller bearing 72 is sandwiched by the stator bracket 44 and an end plate 75 to determine the position of the thrust direction thereof. The deep groove ball bearings 63, 64, 65 and 71 assembled in the sub-assembly unit 7 have a grease sealed structure. The inner rotor shaft 11 is supported by the ball bearing 71 and the radial needle roller bearing 72 so that the radial load of the inner rotor shaft 11 is received by them. The thrust load of the inner rotor shaft 11 is received only by the ball bearing 71 without being received by the radial needle roller bearing 71.

The multi-layer motor 1 is arranged to input coolant (cooling liquid) from the rear end of the stator 20, to flow it in the axial direction of the stator 20 and to return the coolant from a front end of the stator 20 to the rear end of the stator 20 to output the coolant from the rear end of the stator 20.

Cooling jackets 80 for circulating the coolant in the multi-layer motor 1 are formed between bolt holes 81 of core steel plates 21 of the stator 20 and outer peripheries of bolt shaft portions 43a of the bolts 43. The bolts 43 are set to penetrate the bolt holes 81. Since the bolt 43 is formed such that an outer diameter of the bolt shaft portion 43a is smaller than that of screw portions 43b, a sufficient cross-sectional area of a passage for the coolant is ensured at the passages formed between the bolts 43 and the bolt holes 81.

Figure 7:
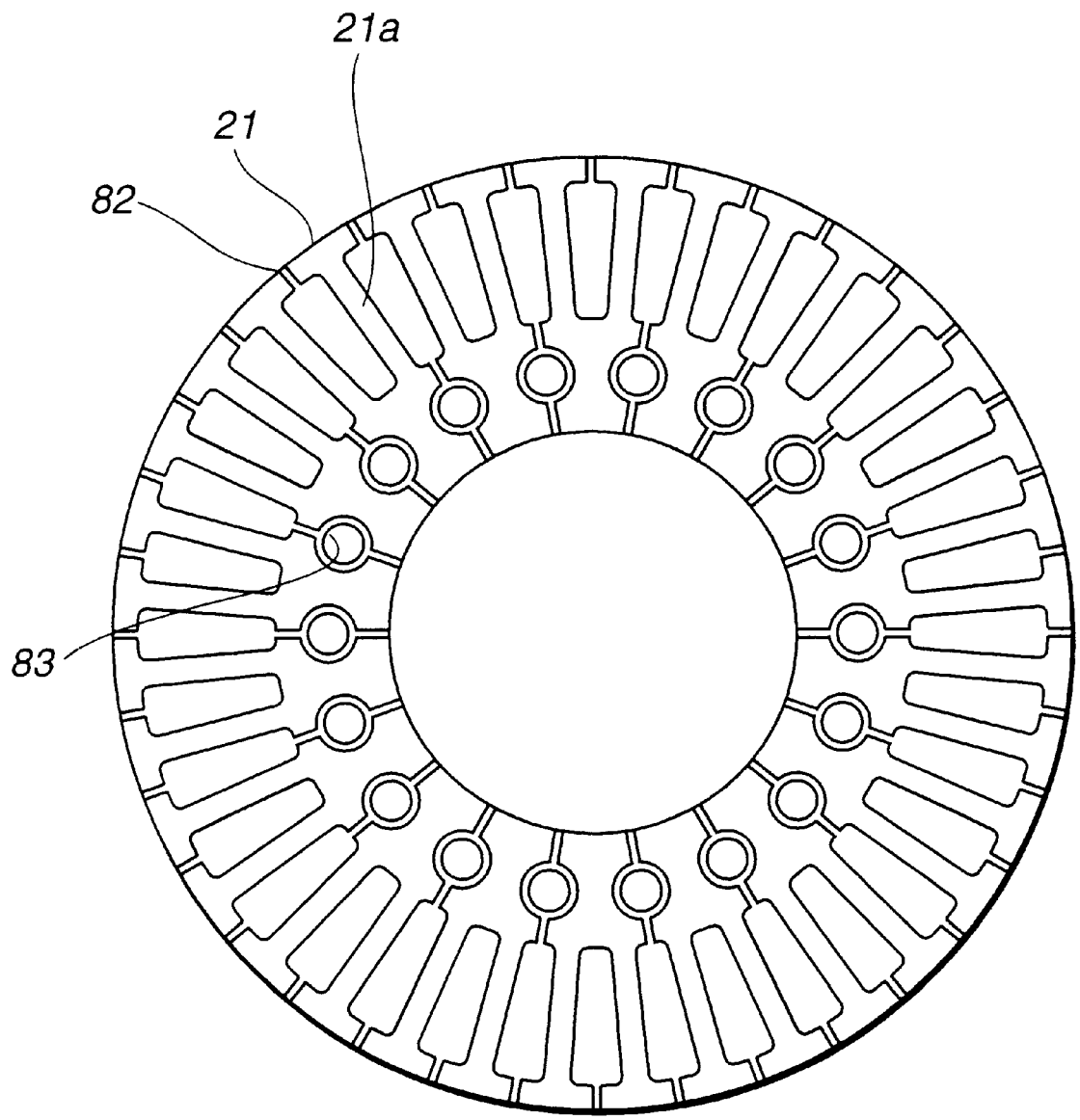
FIG. 7 is a cross-sectional view taken in the direction of the arrows substantially along line VII—VII of FIG. 2.

FIG. 7 shows a cross-sectional view of the stator 20, which is taken in the direction of the arrows substantially along line VII—VII of FIG. 2. The core steel plates 21 are constituted by eighteen pieces which are divided in the radial direction as shown in FIG. 7. The divided pieces are connected with adjacent others through synthetic resin mold 83. Each two coils 15 are wound on each core plate 21, and therefore the stator 20 includes thirty-six coils 15. Each core plate 21 has two core portions 21a extending in the radial direction of the stator 20, and the coil 15 is wound around each core portion 21a. The number of the cooling jackets 80 is set at a half of the number of the coils 15, that is, eighteen. The bolt holes 81 defining the respective cooling jackets 80 are formed between adjacent core plates 21.

Figure 8:
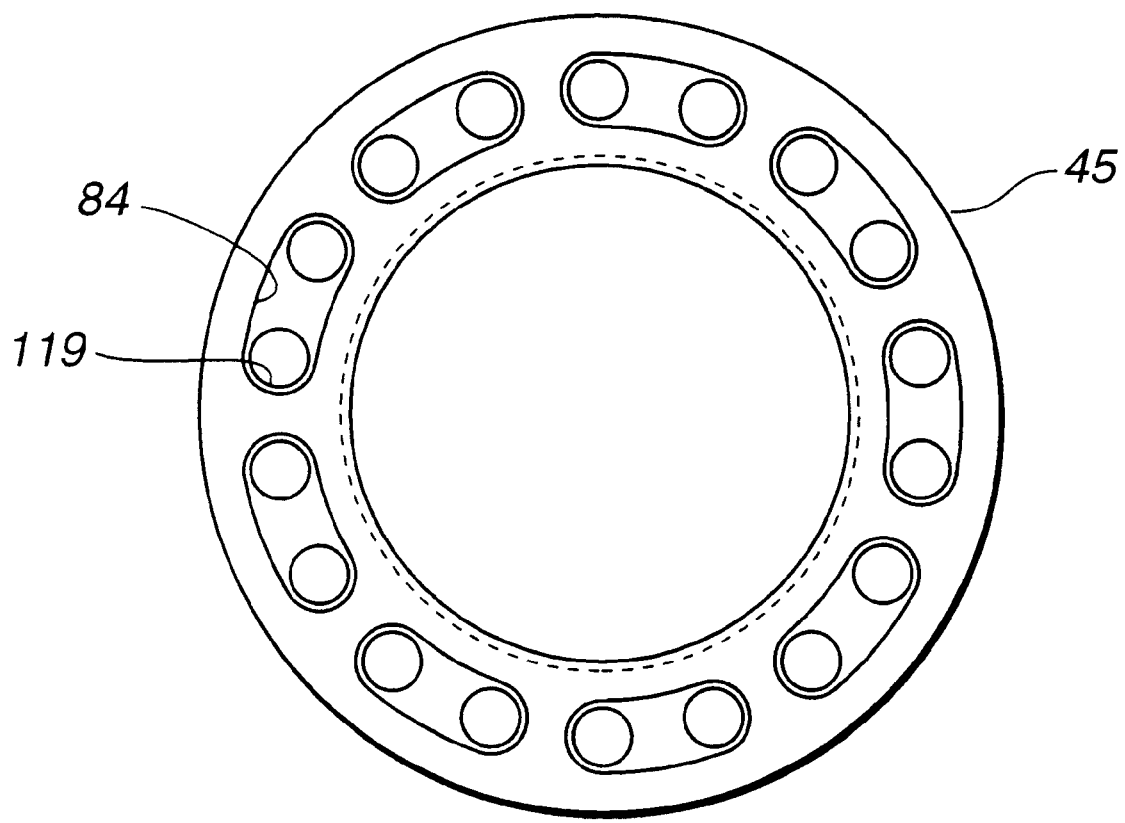
FIG. 8 is a cross-sectional view taken in the direction of the arrows substantially along line VIII—VIII of FIG. 2.

FIG. 8 shows a front view of the front plate 45, which is taken in the direction of the arrows substantially along line VIII—VIII of FIG. 2. The front plate 45 has return ports 84 which function to connect adjacent two cooling jackets 80. The coolant flows in the rightward direction of FIG. 2 through one of the connected two cooling jackets 80 and returns in the leftward direction of FIG. 2 through the other of the connected two cooling jackets 80. Therefore, the flow directions of the coolant in the cooling jackets 80 are arranged alternately. In FIG. 8, numeral 119 denotes thread holes to which the respective thread portions 43a of the bolts 43 are screwed. Liquid gasket seals each portion between each thread hole 119 and each thread portion 43a of the bolt 43 so as to prevent the coolant from flowing to external through the clearance portions.

The motor housing 41 comprises a cylinder portion 41c which protrudes from the outer periphery of the bottom portion 41a toward the rearward. An outer surface of the cylinder portion 41c is fixed to an inner race of the ball bearing 65. An end plate 75 is disposed in the cylinder portion 41c. Passages for supplying the coolant to the cooling jackets 80 are arranged at portions located inside the cylinder portion 41c. The end plate 75 is connected to a rear surface of the bottom portion 41a of the motor housing 41 and is fixed by means of a plurality of bolts 76. Each bolt 76 passes through the end plate 75 and the motor-housing rear wall portion 42 and is screwed to the stator bracket 44.

Figure 3:
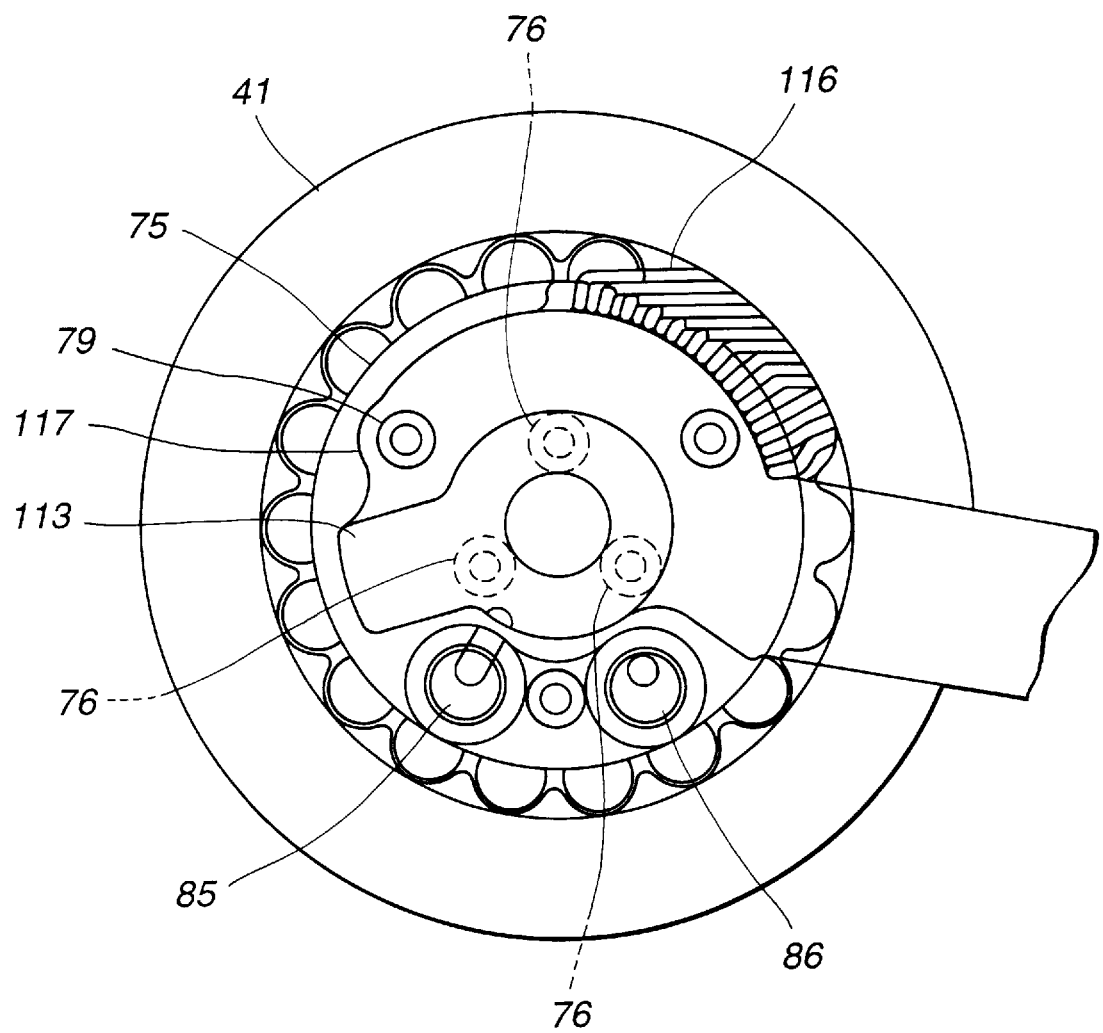
FIG. 3 is a plan view taken in the direction III of FIG. 2.

FIG. 3 shows a plan view of the end plate, which is taken in the direction of arrows substantially along line III—III of FIG. 2. As shown in FIG. 3, a coolant inlet 85 and a coolant outlet 86 for inputting and outputting the coolant to and from the cooling jacket 80 are arranged in the end plate 75. The coolant inlet 85 is connected to a discharge side of a pump through a conduit (not shown), and the coolant outlet 86 is connected to a suction side of the pump through a conduit (not shown and a radiator. Both the coolant inlet 85 and the coolant outlet 86 are disposed inside the ball bearing 65.

In order to synchronously rotate the inner rotor 10 and the outer rotor 30, an inner rotor rotation angle sensor 113 for detecting a phase of the inner rotor 10 and an outer rotor rotation angle sensor 114 for detecting a phase of the outer rotor 30 are installed to the multi-layer motor 1. Each signal from each of the rotation angle sensors 113 and 114 is inputted to a control circuit (not shown). The control circuit outputs PWM signal on the basis of the data of necessary torque (negative and positive) to the inner rotor 10 and the outer rotor 30. The outer-rotor rotation angle sensor 114 is fixed to the gear housing 50 by means of the bolts 165 so as to face with a scale portion 27b of the inner dram cover 27. This arrangement enables the outer-rotor rotation angle sensor 114 to detect the phase of the outer rotor 30.

As shown in FIG. 3, each coil 15 receives electric current through each wire 116. Each wire 116 and the inner-rotor rotation angle sensor 113 are integrally formed into a unit part 117 by synthetic resin molding. The unit part 117 is fixed to the end plate 75 by means of three bolts 79. A rotating portion of the inner-rotor rotation angle sensor 113 is splined to the rear end of the inner rotor shaft 11 so as to allow the thrust displacement of the inner rotor shaft 11. The connection between the inner-rotor rotation angle sensor 113 and the inner rotor shaft 11 may be established by other method, such as a width across flat structure. The unit part 117 is disposed inside the coolant inlet 85 and the coolant outlet 86 with respect to the center of the axis of the multi-layer motor 1 so that the unit part 117 does not project from the rear end of the multi-layer motor 1.

Figure 4:
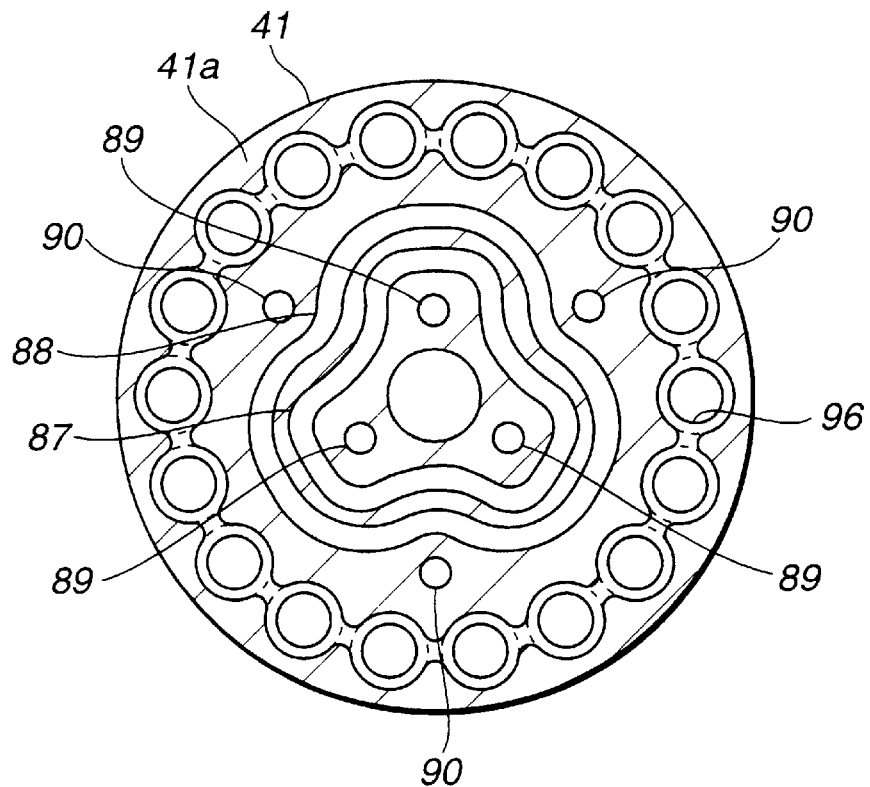
FIG. 4 is a cross-sectional view taken in the direction of the arrows substantially along line IV—IV of FIG. 2.

FIG. 4 shows a cross-sectional view of the bottom portion 41a of the motor housing 41, which is taken in the direction of the arrows substantially along line VI—VI of FIG. 2. Two annular passages 87 and 88 functioning as a coolant passage are provided on the bottom portion 41a of the motor housing 41. The inner annular passage 87 is communicated with the coolant inlet 85 of the end plate 75, and the outer annular passage 88 is communicated with the coolant outlet 86 of the end plate 75. The inner and outer annular passages 87 an 88 are configured into a complexly curved shape so as to avoid holes 89 for the bolts 76 and holes 90 for the bolts 79, as shown in FIG. 4.

Figure 5:
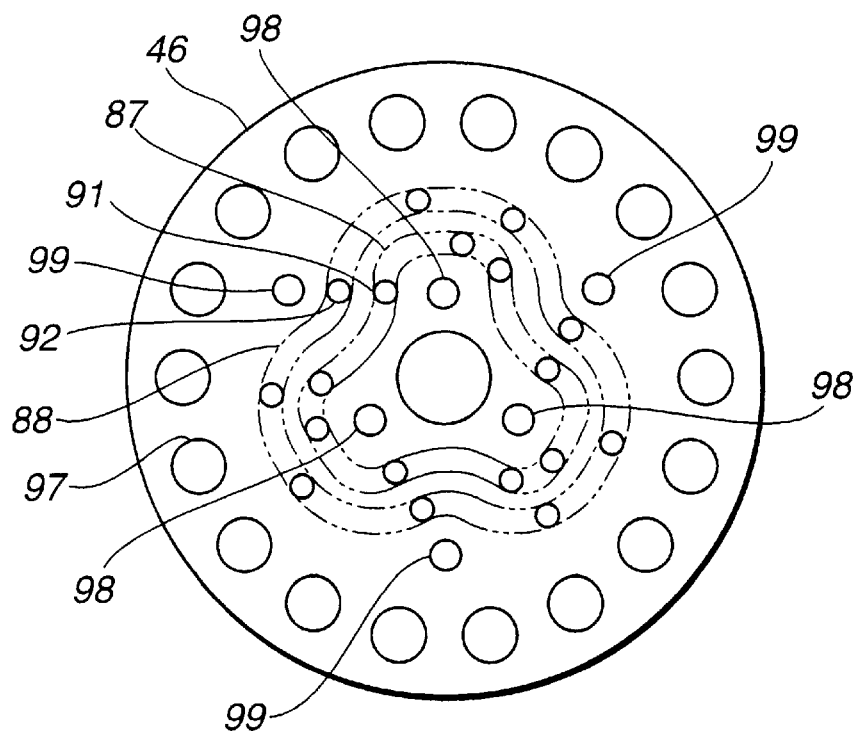
FIG. 5 is a cross-sectional view taken in the direction of the arrows substantially along line V—V of FIG. 2.

FIG. 5 shows a front view taken in the direction of the arrows substantially along line V—V of FIG. 2, showing the partition plate 46. The partition plate 46 has nine holes 91 communicated with the inner annular passage 87 and nine holes 92 communicated with the outer annular passage 88. In FIG. 5, the annular passages 87 and 88 are shown by two-dot and dash lines. Numeral 97 denotes holes for installing the bolts 43, 98 denotes holes for installing the bolts 76, and 99 denotes holes for installing the bolts 79.

Figure 6:
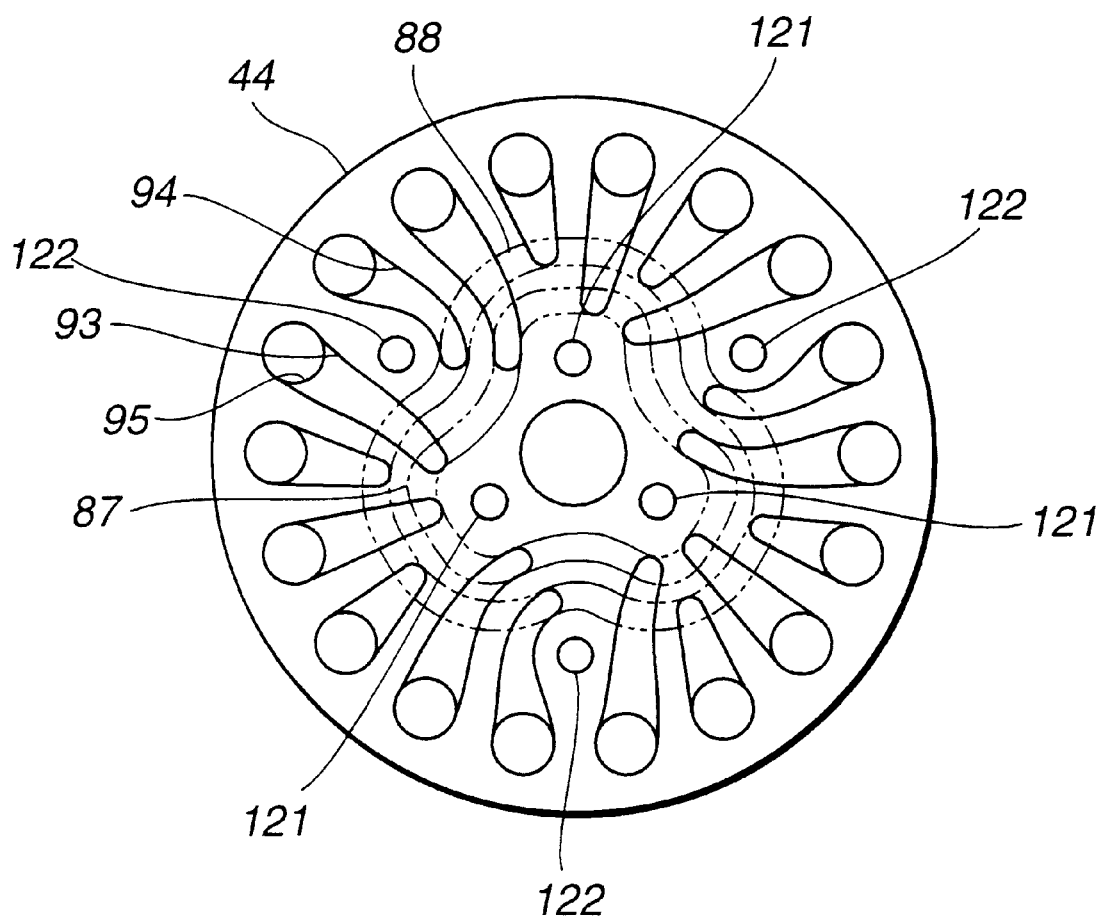
FIG. 6 is a cross-sectional view taken in the direction of the arrows substantially along line VI—VI of FIG. 2.

FIG. 6 shows a front view of the stator bracket 44, which is taken in the direction of the arrows substantially along line VI—VI of FIG. 2. The stator bracket 44 has nine radial passages 93 and nine radial passages 94 which radially extend in the stator bracket 44 as shown in FIG. 6. Inner peripheral portions of the radial passages 93 are communicated with the inner annular passage 87 through the holes 91. Inner peripheral portions of the radial passages 94 are communicated with the outer annular passage 88 through the holes 92. In FIG. 6, the annular passages 87 and 88 are shown by two-dot and dash lines. Outer end portions of the radial passages 93 and 94 are connected to the holes 95 for the bolts 43 and are communicated with the cooling jackets 89. Numeral 121 denotes holes for the bolts 76, and 122 denotes holes for the bolts 79.

Figure 9:
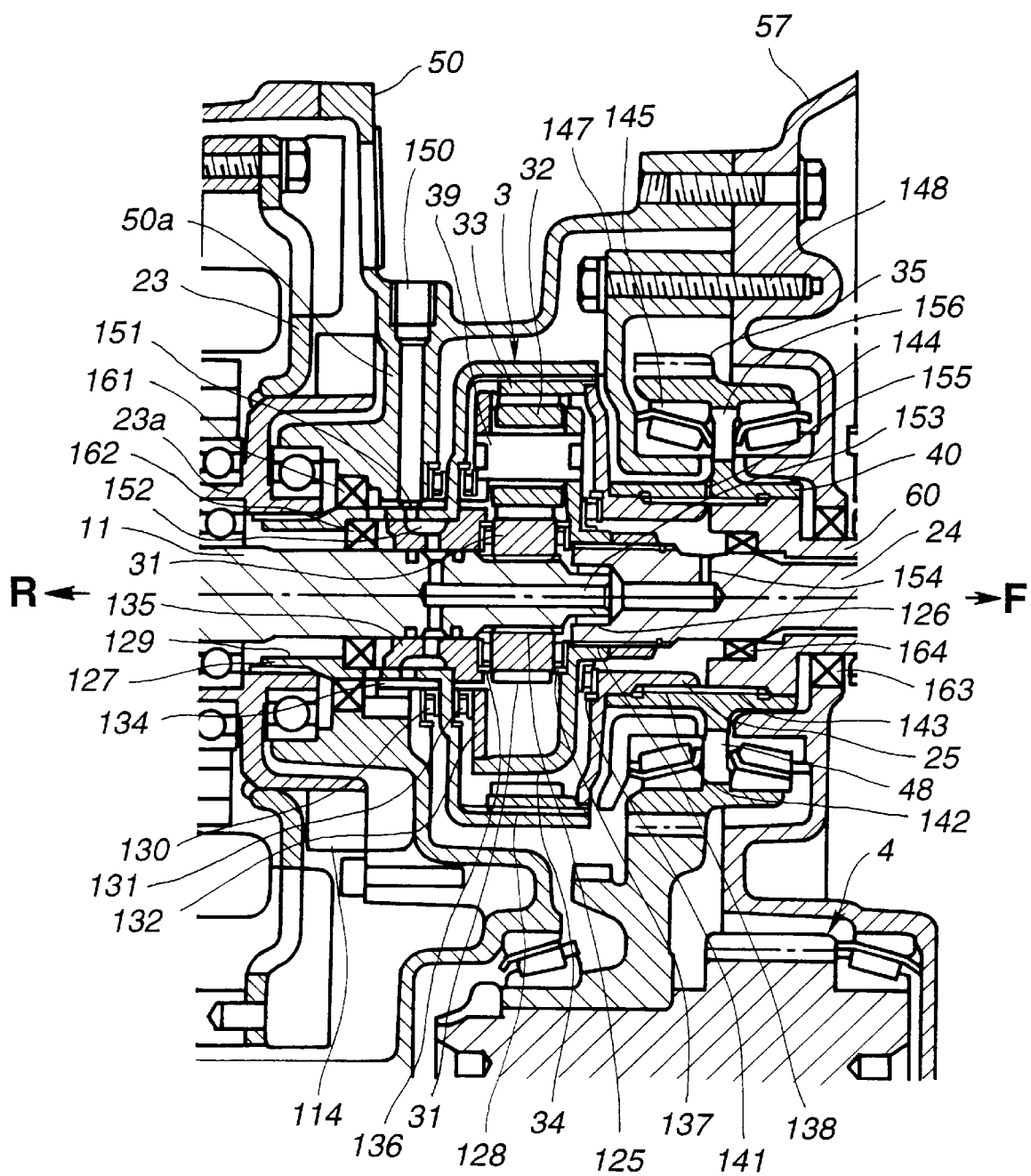
FIG. 9 is a cross-sectional view showing a planetary gear mechanism employed in the hybrid drive system.

As shown in FIG. 9, the gear housing 50 has a thrust receiving wall portion 50a which receives a thrust load applied to the planetary gear mechanism 3. The front end portion of the inner rotor shaft 11 is splined to the sun gear 31 through their spline portions 125 and is connected to the engine output shaft 24 through a radial push bearing 126 so as to be slidable in the rotational direction and the thrust direction. Further, the cylinder shaft portion 27a is splined to the rotation member of the ring gear 33 through spline portions 127 thereof. This arrangement enables a rotational power transmission between the inner rotor 10 and the sun gear 31 and a rotational power transmission between the outer rotor 30 and the ring gear 33 while preventing the thrust load from being applied from the planetary gear mechanism 3 to the inner rotor shaft 11. This thrust load canceling structure enables the first sub-assembly unit 7 and the second sub-assembly unit 8 to produce into the respective unit structure. Therefore, it is possible to operate the multi-layer motor 1 as an electric mover or generator by supporting the inner rotor shaft 11 in the thrust direction even if only the sub-assembly unit 7 is installed.

The rotation member 129 is splined to an outer periphery of the ring gear 33 through spline structures 128 thereof. A thrust needle roller bearing 130 is installed between the rotation member 129 and the thrust receiving wall portion 50a of the gear housing 50. A thrust needle roller bearing 131 is installed between the rotation member 129 and a disc plate 132, which supports the pinions 39 and the carrier 34. Therefore, the thrust load to the rotation member is received by the thrust needle roller bearings 130 and 131. A radial bush bearing 134 is installed between the rotation member 129 and the gear housing 50 so that the radial load of the rotation member 129 is received to the radial bush bearing 134.

A sleeve 135 is installed between the inner rotor shaft 11 and the rotation member 129. A thrust needle roller bearing 136 is installed between the sleeve 135 and the sun gear 31. A thrust needle roller bearing 137 is installed between the sun gear 31 and the carrier 34. The carrier 34 is splined to the engine output shaft 24 through their splines 138. A thrust needle roller bearing 141 is installed between the carrier 34 and the rotation member 25 of the ring gear 33.

The output gear 35 is concentrically arranged around the output gear shaft 40. The output gear 35 and the output gear shaft 40 are integrally formed through a disc portion 48 of a disc shape. The rotation member 25 of the ring gear 33 is splined to an inner periphery of the output gear shaft 40 through their splines 142. The clutch output shaft 60 is also splined to the inner periphery of the output gear shaft 40 through their splines 143. Splines 127 of the cylinder shaft portion 27a and splines 138 of the carrier 34 are formed by means of broaching.

A sub-housing 147 is fixed to the clutch housing 57 by means of a plurality of bolts 148. The output gear shaft 40 is supported to a pair of tapered roller bearings 144 and 145 in a space formed between the clutch housing 57 and the sub-housing 147. The roller bearing 144 is installed between the sub-housing 147 and the disc portion 48. The tapered roller bearing 145 is installed between the clutch housing 57 and the disc portion 48. The tapered roller bearing 144 is arranged such that a front end of its inner race is in contact with the clutch housing 57 and that a rear end of its outer race is in contact with the disc portion 48 of the output gear 35. The tapered roller bearing 144 receives a thrust load applied to the output gear 35 toward a right hand side direction in FIG. 9. Similarly, the tapered roller bearing 145 is arranged such that a rear end of its inner race is in contact with the sub-housing 147 and that a front end of its outer race is in contact with the disc portion 48 of the output gear 35. The tapered roller bearing 145 receives a thrust load applied to the output gear 35 toward a left hand side direction in FIG. 9. The tapered roller bearings 144 and 145 are arranged such that the respective tapered rollers are outwardly inclined. This arrangement of the tapered roller bearings 144 and 145 decreases an axial span therebetween.

An oil inlet 150 functioning as an oil passage for leading oil into the gear housing 50 is provided at the thrust receiving wall portion 50a of the gear housing 50. This arrangement enables the planetary gear mechanism 3 and the tapered roller bearings 144 and 145 to be forcibly lubricated. Oil discharged from an electric oil pump (not shown) is led to the oil inlet 150 and flows to an oil gallery 153 in the inner rotor shaft 11 through an annular passage 151 of the radial bush bearing 134 and an annular passage 152 of the sleeve 135. A part of the oil is led to the planetary mechanism 3 through the radial bush bearing 126, and the remain is led to the tapered roller bearings 144 and 145 and the output gear 35 through a plurality of through-holes 155 of the output gear shaft 40 and a plurality of holes 156 of the disc portion 48. The oil lubricated the various places as mentioned above is returned to the oil pump through return passages (not shown) connected to the gear housing 50. The through holes 155 also function as an operation window during uninstall of bearings.

An oil seal 161 is installed between the gear housing 50 and the rotation member 129. An oil seal 162 is installed between the rotation member 129 and the inner rotor shaft 11. An oil seal 163 is installed between the clutch housing 57 and the clutch output shaft 60. An oil seal 164 is installed between the clutch output shaft 60 and the engine output shaft 24. The oil seals 161 to 164 functions so as to prevent the oil led to the planetary gear mechanism 3 and the tapered roller bearings 144 and 145 from leaking toward the multi-layer motor 1 or the electromagnetic clutch 6.

Hereinafter, the manner of operation of the embodiment according to the present invention will be discussed.

When the vehicle is running in a normal state, the torque generated by the engine 2 is transmitted to the carrier 34 through the crankshaft, the drive plate 49, the flywheel damper 26 and the engine output shaft 24, and further the toque to the carrier 34 is distributed through the pinions 32 to sun gear 31 and the ring gear 33. By operating the inner rotor 10 and the outer rotor 30 as an electric mover or generator during this period, the rotation speed and the torque of the output gear shaft 40 is controlled.

Since the outer rotor 30 disposed around the stator 20 has a rotation diameter which is larger than that of the inner rotor 10 disposed inside the stator 20, it is possible to increase the generated torque by means of the outer rotor 30. By rotating the outer rotor 30 integrally with the output gear shaft 40 through the ring gear 33, a large torque is directly applied from the outer rotor 30 to the output gear shaft 40 during the start of the vehicle so as to satisfy the required acceleration performance of the vehicle. Further, when the vehicle is decelerated, the braking torque is directly applied from the output gear shaft 40 to the outer rotor 30 so as to effectively generate the power by means of the regenerative braking.

When the vehicle is running in high speed, by transmitting the engine torque directly to the output gear shaft 40 through the engagement of the electromagnetic clutch 6, the engine output is distributed at the planetary gear mechanism 3, and the inner rotor 10 executes the power generation. Further, by directly connecting the engine 2 and the output gear shaft 40 without operating the outer rotor 30, the power generation amount at the inner rotor 10 is suppressed small. This enables the inner rotor 30 to be produced compact.

The inner rotor 10 and the outer rotor 30 of the multi-layer motor 1 is concentrically arranged, and the sun gear 31, the carrier 34 and the ring gear 33 of the planetary gear mechanism 3 are coaxially arranged with the inner and outer rotors 10 and 30. This arrangement enables the assembly unit of the hybrid drive system to be produced small. As a result, it is possible to decrease the limitation with respect to the size of the multi-layer motor 1 equipped in the vehicle and to simplify the power output structure for outputting the power from the output gear 35.

The multi-layer motor 1 is arranged such that the radial load to the outer rotor dram 13 is received by the ball bearings 63, 64 and 65. Since the supporting span between the ball bearing 65 and the ball bearings 63 and 64 is ensured sufficiently, the supporting rigidity of the outer rotor dram 13 is sufficiently ensured, and the gap between the outer rotor 30 and the stator 20 is properly maintained.

The thrust load applied to the outer rotor 30 is received by the pair of ball bearings 63 and 64 without being received by the boll bearing 65. This facilitates the provision of a snap ring for positioning the ball bearing 65 with respect to the outer rotor shaft portion 30*b* and therefore it is possible to decrease a longitudinal dimension of the outer rotor dram 13.

When the first sub-assembly unit 7 is assembled, the outer rotor shaft 30*a* is engaged with the outer race of the ball bearing 65 after the ball bearing 65 is connected to the motor housing 41 through the snap ring 67. Since the first sub-assembly unit 7 has a structure unnecessary to execute the positioning of the outer rotor shaft 30*b* to the ball bearing 65 regarding the thrust direction, the assembly operation of the outer rotor 30 to the motor housing 41 is easily executed so as to improve the productivity of the multi-layer motor 1.

Further, during the assembly of the first sub-assembly unit 7, since the outer rotor dram 13 is assembled to the motor housing 41 before the assembly of the stator 20 while being separated from the outer dram cover 23, it is possible to design the opening diameter of the outer rotor shaft portion 30*b* to be smaller than the outer diameter of the stator 20. Therefore, it is possible to increase the maximum rotation speed of the outer rotor 30 by decreasing the diameter of the ball bearing 65.

The radial load to the inner rotor 10 is received by the ball bearing 71 and the radial needle roller bearing 72, and the thrust load to the inner rotor 10 is received only by the ball bearing 71. Therefore, it is possible to support the inner rotor shaft portion 10*b* by means of a thin radial needle roller bearing 72.

Since the ball bearing 65 and the radial needle roller bearing 72 installed at the rear portion of the multi-layer motor 1 become compact by specifying them into a radial load receiving structure, a space for installing the supporting structure of the stator 20 and a space for flowing in and out the coolant for cooling the stator 20 are ensured.

The positioning of the radial needle roller bearing 72 in the thrust direction is executed by sandwiching the radial needle roller bearing 72 between the stator bracket 44 and the end plate 75.

The rotation angle sensor 114 detects the phase of the outer rotor 30 facing with the scale portion 27*b* of the inner dram cover 27. By integrally forming the scale portion 27*a* with the inner dram cover 27 supported by the pair of the ball bearings 63 and 64, the displacement of the scale portion 27*b* with respect to the rotation angle sensor 114 is suppressed small. Therefore, the detection accuracy of the rotation angle sensor 114 is maintained sufficiently.

The coolant (cooling liquid) circulating the inside of the stator 20 absorbs the heat generated by the copper loss or iron loss of the stator 20. Since the stator 20 is cantilevered and the outer dram cover 23 of the outer rotor 30 facing with the front end of the stator 20 is rotated. Accordingly, it is difficult to provide the coolant port at the front end of the stator 20. Therefore, the cooling jackets 80 in the stator 20 is arranged such that the coolant flows from the rear end of the stator 20, is returned at the front end of the stator 20 and is discharged from the rear end.

The coolant discharged from the pump is distributed to the cooling jackets 80 through the inlet 85, the annular passage 87, the holes 91 and the radial passages 93. The coolant circulating the cooling jackets 80 absorbs the heat of the stator 20 and is flowed out through the radial passages 94, the holes 92, the annular passage 88 and the outlet 86. Further, the coolant passes through the radiator to radiate the heat thereof to external and is then sucked into the pump.

Since the cooling jackets 80 are defined around the bolts 43 for fixing the stator 20, it possible to tightly arrange the cooling jackets 80 in the restricted space inside the coil 15. This enables the stator 20 to be sufficiently cooled and avoids the stator 20 from becoming large due to the provision of the cooling jackets 80.

By setting the number of the cooling jackets 80 at one-integer of the number of the coils 15 and by arranging the coils 15 symmetrically to the cooling jackets 80, the cooling of the stator 20 is equivalently achieved in the axial direction.

Since the going passage and the coming passage of the cooling jackets 80 are alternately arranged, even if the temperature of the coolant gradually increases during a process flowing through the cooling jackets 80, the cooling of the stator 20 is equivalently achieved in the axial direction.

Since the motor housing rear wall portion 41*a* including the annular passages 87 and 88 and the stator bracket 44 including the radial passages 93 and 94 are laminated, it is possible to provide the coolant inlet and outlet passages in the space between the ball bearing 65 and the inner rotor shaft 11. By receiving the coolant passages in the small space, it is possible to use the small sized ball bearing 65. This increases the maximum rotation speed of the outer rotor 30.

Since the assembled housing has a small hole and the terminal plates of the wires 116 and the rotation angle sensor 113 are integrally formed into the unit part 117 by synthetic resin molding for executing soldering of the terminal plate after assembly, it is easy to assemble the wires 116 connected to the coils 15 and the rotation angle sensor 113. This improves the productivity of the motor assembly.

Since the unit part 117 is installed in the space between the inlet 85 and the outlet 86 and the inner rotor 10, the unit part 117 is set so as not to project from the rear end of the motor 1. This decreases the longitudinal length of the motor 1.

The thrust receiving portion 50a for receiving the thrust load applied to the planetary gear mechanism 3 is disposed in the gear housing 50. The inner rotor 10 is splined to the sun gear 31 though their splines 125 so as not to apply the thrust load therebetween. The outer rotor 30 is splined to the ring gear 33 through their splines 127 so as not to apply the thrust load therebetween. Therefore, it is possible to separate the first sub-assembly unit 7 assembling the motor 1 and the second sub-assembly unit 8 assembling the planetary gear mechanism 3. As a result, it is possible to check the performance of the motor 1 during the producing process by operating the motor 1 assembled into the first sub-assembly unit 7 through a test machine.

Since the hybrid drive system is arranged such that the thrust load between the planetary gear mechanism 3 is canceled, it is possible to avoid the ball bearings 63, 64 and 71 from becoming large. This improves the durability of the ball bearings 63, 64 and 71.

The thrust load applied to the output gear 35 constituted by helical gears is received by the pair of roller bearings 144 and 145. Therefore, the thrust load applied to the output gear shaft 40 is not applied to the planetary gear mechanism 3 due to the splines 142. This ensures the operational ability of the planetary gear mechanism 3. Further, this prevents the bearing structure constituted by the thrust needle roller bearings 130, 131, 136, 137 and 141 from becoming large. This improves the durability thereof. Furthermore, since the planetary gear mechanism 3 and the output gear shaft 40 are arranged to be independently supported, it is easy to change the design of the planetary gear mechanism 3 and the output gear shaft 40 according to the change of the equipped vehicle.

Since the roller bearings 144 and 145 are arranged such that each tapered roller thereof is outwardly inclined, the axial span between the roller bearings 144 and 145 is decreased. With this arrangement, it is possible to arrange the planetary gear mechanism 3, the output gear 35 and the electromagnetic clutch 6 in parallel within the space between the motor 1 and the engine 2.

The oil fed to the oil inlet 150 flows into the oil gallery 153 in the inner rotor shaft 11 through the annular passage 151 of the radial bush bearing 134 and the annular passage 152 of the sleeve 135. A part of the oil fed to the oil gallery 153 is fed to the planetary gear mechanism 3 through the radial bush bearing 126, and the remaining is fed to the roller bearings 144 and 145, the output gear 35 through the holes 156 of the disc portion 48. Centrifugal force is applied to the oil to aid the oil to be fed to the roller bearings 144 and 145 and the output gear 35. This ensures the rubricating performance of the hybrid drive system.

Since the hybrid drive system is arranged such that the oil fed to the oil inlet 150 of the thrust receiving portion 50a is fed to the planetary gear mechanism 3 and the output gear 35, it is possible to provide the oil passages including the oil inlet 150 in the second sub-assembly unit 8. That is, it is not necessary to provide the oil passages in the first sub-assembly unit 7. This simplifies the structure of the first sub-assembly unit 7.

It will be understood that the multi-layer motor 1 may be arranged such that the independent coils for each inner and outer rotors 10 and 30 are provided in the stator 20. Further, the multi-layer motor 1 may be of an induction type in which the inner and outer rotors 10 and 30 have coils, respectively. Furthermore, although the embodiment according to the present invention has been shown and described such that the outer rotor 30 and the inner rotor 10 are independently rotated, it will be understood that the invention is not limited to this and may be arranged such that the outer rotor 30 and the inner rotor 10 are integrally rotated.

Although the embodiment according to the present invention has been shown and described such that the output of the outer and inner rotors 30 and 10 are respectively outputted from the front end side of the multi-layer motor 1, it will be understood that the output is picked up from the rear end side of the motor 1. Further, it will understood that a dry single plate clutch or wet multi plate clutch may be employed instead of the electromagnetic clutch 6. Further, the outer dram cover 23 and the inner dram cover 27 may be fixed by means of riveting.

The annular passages 87 and 88 of the motor housing rear wall portions 41a may be formed at the side of the end plate 75, and holes communicating the annular passage 87 and 88 and the radial passages 93 and 94 of the stator bracket 44 may be provided. In this arrangement, it is possible to facilitate the partition plate 46.

Instead of the radial bush bearing 126, a needle roller bearing may be employed. This increases the oil amount fed to the planetary gear mechanism 3.

Further, it will be understood that the invention is not limited to the motor 1 which constitutes the hybrid drive system with the engine and may be applied to the others employing the motor.

The entire contents of Japanese Patent Application No. 10-174543 filed on Jun. 22, 1998 in Japan are incorporated herein by reference.

Although the invention has been described above by reference to certain embodiments of the invention, the invention is not limited to the embodiments described above. Modifications and variations of the embodiments described above will occur to those skilled in the art, in light of the above teaching.

What is claimed is:

1. A motor with a cooling structure, comprising:
   a motor housing;
   a stator of a cylindrical shape fixed to said motor housing;
   an outer rotor rotatably installed around said stator;
   an inner rotor rotatably installed inside said stator, said inner rotor, said stator and the said outer rotor being concentrically arranged;
   a plurality of pairs of cooling jackets formed in said stator;
   a coolant inlet port and a coolant outlet port provided in the vicinity of an axial end of said inner rotor which end is opposite to an output end portion of said outer rotor, said coolant inlet and outlet ports being connected to said cooling jackets to supply and discharge coolant to and from said cooling jackets, said coolant inlet port being nearer than said cooling jackets to a rotational axis of said inner rotor; and
   a coolant return portion provided in the vicinity of the other axial end of said inner rotor, said coolant return portion connecting each pair of said cooling jackets.

2. A motor with a cooling structure as claimed in claim 1, further comprising a plurality of bolts for fixing said stator to said motor housing, said cooling jacket being defined by said stator and said bolts.

3. A motor with a cooling structure as claimed in claim 1, wherein said cooling jackets are arranged such that said cooling jacket, which flows coolant from a coolant inlet port toward said coolant return portion, is located adjacent to said cooling jacket, which flows the coolant from said coolant return portion to a coolant outlet port.

4. A motor with a cooling structure as claimed in claim 1, wherein said cooling jacket, which flows coolant from a coolant inlet port toward said coolant return portion, and said cooling jacket, which flows the coolant from said coolant return portion to a coolant outlet port, are alternately arranged.

5. A motor with a cooling structure as claimed in claim 1, wherein the number of said cooling jackets is set at one-half of the number of coils wound to said stator, said cooling jackets being arranged at equal intervals.

6. A motor with a cooling structure as claimed in claim 1, further comprising an inner annular passage connected to said coolant inlet port, an outer annular passage connected to said coolant outlet port, inlet radial passages connecting the inner annular passage and said cooling jackets, and outlet radial passages connecting the outer annular passage and said cooling jackets, the inner and outer annular passages being concentrically arranged.

7. A motor with a cooling structure as claimed in claim 6, further comprising a first member including the inner annular passage and the outlet annular passage, and a second member including the inlet radial passages and the outlet radial passages, the first and second members being laminated in an axial direction of the motor.

8. A motor with a cooling structure as claimed in claim 7, wherein said inner rotor is rotatably supported to said motor housing through a second bearing installed in the first and second members.

9. A motor with a cooling structure as claimed in claim 7, wherein the first and second members have through-holes through which a part of said inner rotor penetrates.

10. A motor with a cooling structure as claimed in claim 1, further comprising a first bearing through which said outer rotor is rotatably supported said motor housing, and a plurality of members which are laminated in the axial direction inside the first bearing, a passage for supplying coolant to said coolant inlet port being formed between the laminated members.

11. A motor with a cooling structure as claimed in claim 1, wherein the output end portion of said outer rotor and an output end portion of said inner rotor are connected to a planetary gear mechanism.

12. A motor with a cooling structure as claimed in claim 1, wherein said inner rotor is constituted by a cylindrical inner rotor shaft rotatably supported to said motor housing through bearings and a plurality of permanent magnets fixed around the inner rotor shaft, and said outer rotor is constituted by a cylindrical outer rotor dram rotatably supported to said motor housing through bearings and a plurality of permanent magnets fixed on an inner surface of the outer rotor dram.

13. A motor with a cooling structure as claimed in claim 12, wherein the outer rotor dram of said outer rotor has a plurality of cooling fins for supplying cooling air to said stator when said outer rotor is rotating.

14. A motor with a cooling structure as claimed in claim 1, wherein said stator is constituted by a plurality of core plates and a plurality of coils which are wound on the core plate such that the two coils are wound to each core plate.

15. A motor as claimed in claim 1, wherein said coolant inlet port is connected to said cooling jackets through an inner annular passage and radial passages.

16. A motor with a cooling structure as claimed in claim 1, wherein the radial passages radially extend so as to communicate the inner annular passage with said cooling jackets.

17. A cooling system of a multi-layer motor, the multi-layer motor comprising a motor housing, a cylindrical stator fixed to the motor housing, an outer rotor rotatably installed around said stator and an inner rotor rotatably installed inside said stator, said cooling system comprising:

means defining a plurality of cooling jackets for flowing coolant to cool the stator;

means defining a coolant inlet port for said cooling jackets, said coolant inlet port defining means being disposed at an axial end of the stator, said coolant inlet port defining means being nearer than said cooling jacket defining means to a rotational axis of the inner rotor;

means defining a coolant outlet port for said cooling jackets, said coolant outlet port defining means being disposed at the axial end of the stator which end is the same as that of said coolant inlet port; and means defining a coolant return portion for connecting a pair of said cooling jacket defining means at the other axial end of the stator.

18. A cooling structure as claimed in claim 17, wherein said cooling jacket defining means includes the stator and bolts for fixing the stator to the motor housing.

19. A cooling system as claimed in claim 17, further comprising means defining an inner annular passage and means defining radial passages, the coolant inlet port being connected to the cooling jackets through the inner annular passage and the radial passages.

* * * * *